(No Model.) 2 Sheets—Sheet 1.
G. HARRIOTT.
BICYCLE.
No. 499,109. Patented June 6, 1893.
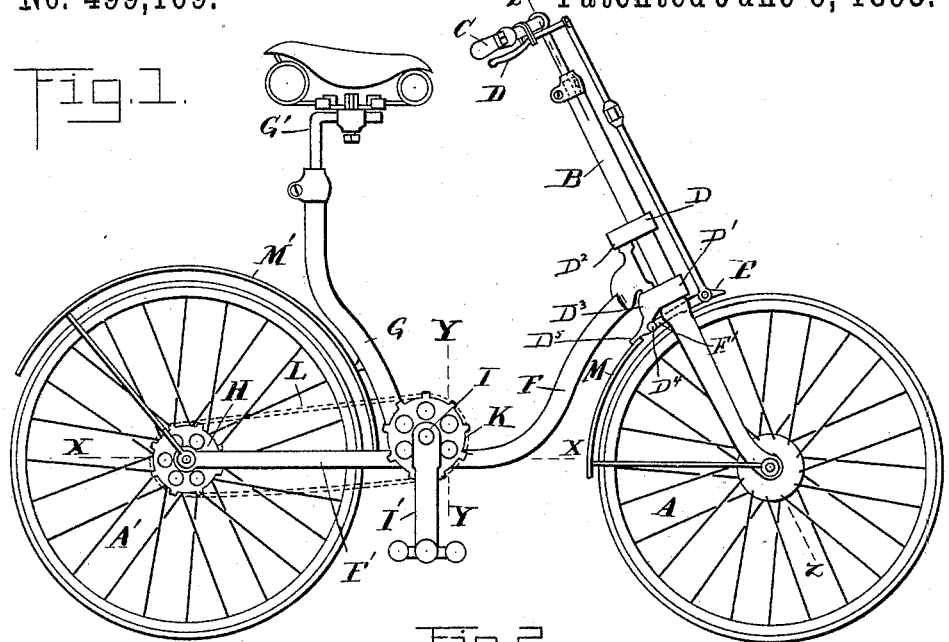
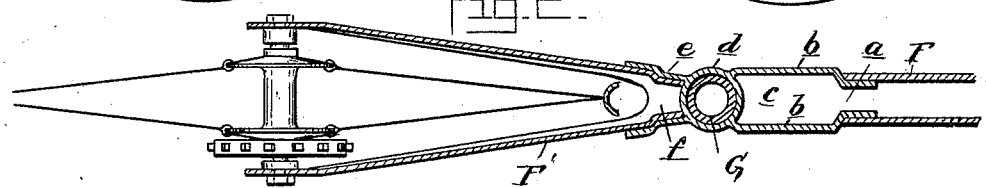
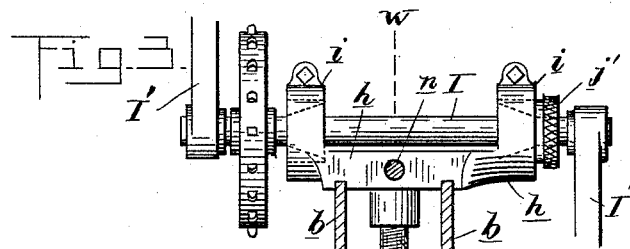
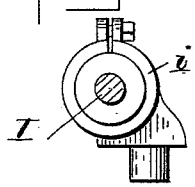
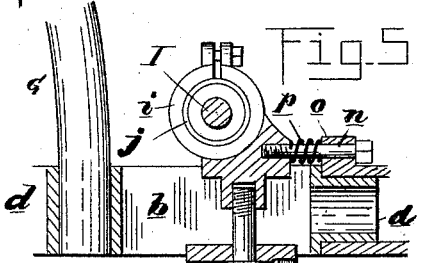
Witnesses
Geo. C. Gregg.
P. M. Hulbert
Inventor
George Harriott
By James Whittemore
Att'y.

(No Model.) 2 Sheets—Sheet 2.
G. HARRIOTT.
BICYCLE.
No. 499,109. Patented June 6, 1893.
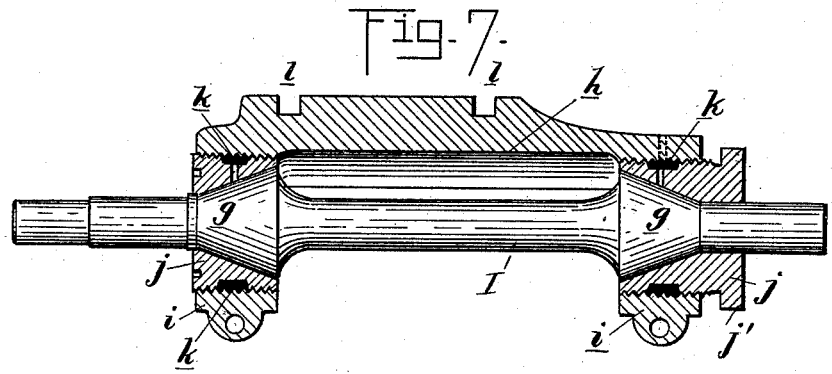
Witnesses.
Geo. A. Gregg.
P. M. Hulbert
Inventor
George Harriott
By James Whittemore
Atty

UNITED STATES PATENT OFFICE.

GEORGE HARRIOTT, OF TOLEDO, OHIO, ASSIGNOR TO THE GENDRON IRON WHEEL COMPANY, OF SAME PLACE.

BICYCLE.

SPECIFICATION forming part of Letters Patent No. 499,109, dated June 6, 1893.

Application filed May 13, 1890. Serial No. 351,700. (No model.)

*To all whom it may concern:*

Be it known that I, GEORGE HARRIOTT, a subject of the Queen of Great Britain, residing at Toledo, in the county of Lucas and State of Ohio, have invented certain new and useful Improvements in Bicycles, of which the following is a specification, reference being had therein to the accompanying drawings.

This invention relates to new and useful improvements in bicycles, and the invention is especially designed to apply that type of bicycle commonly known as "safety" and the invention consists in the peculiar construction and arrangement of the front upright and the parts connected therewith and of the crank shaft and crank shaft bearing whereby a perfect adjustment of the drive mechanism is provided, all as more fully hereinafter described and shown in the accompanying drawings, in which—

Figure 1 is a side elevation of a safety bicycle to which my invention is applied. Fig. 2 is a horizontal section through the rear portion of the frame on line $x\ x$ in Fig. 1. Fig. 3 is a cross-section of the frame on line Y Y in Fig. 1, showing the crank and crank bearing in elevation. Fig. 4 is an end elevation of the crank bearing. Figs. 5 and 6 are vertical central sections on line W W in Fig. 4 with this difference, that in Fig. 6 the crank bearing is differently adjusted. Fig. 7 is a vertical central longitudinal detail section through the crank bearing.

A is the steering wheel and A' the drive wheel, both substantially of the same diameter.

B is the front standard, in the fork of which the steering wheel is journaled.

C is the steering lever adjustably secured in the front standard.

D is the brake lever provided with suitable connection to the brake shoe E.

F is the frame pivotally connected to the front standard and provided with the rear fork F' in which the drive wheel is journaled.

G is the tubular seat standard, upon which the seat G' is vertically adjustably supported.

H is the sprocket wheel secure to the drive wheel.

I is the crank shaft upon which the sprocket wheel K is secured.

L is the drive chain passing around the sprocket wheels H and K, and M M' are the front and rear mud guards respectively.

The invention which forms the subject matter of this application has no reference to the above described parts, which are substantially of known construction and operation, except as hereinafter described.

The frame F is formed of a front portion, which is curved down over the rear side of the steering wheel, and a slotted rear portion in front of the drive wheel and substantially in horizontal plane with the axle thereof. This slotted portion is preferably formed of a separate piece of steel drop forging consisting of the tubular neck $a$, the parallel ways $b$ between which the slot $c$ is forged, the cylindrical socket $d$ adapted to receive the seat tube and the thimble $e$ adapted to receive the neck of the rear fork. The curved front portion of the frame is preferably formed of steel tubing, into the rear end of which the neck $a$ of the horizontal portion is secured by brazing, the rear fork is also made of steel, with a neck $f$, which is secured by brazing into the thimble $e$, and the seat tube is also made of steel tubing and secured by brazing into the socket $d$.

The crank shaft I is preferably formed of steel drop forging and has the sprocket wheel K and pedal cranks I' secured upon its outer ends; it is provided with cone journals $g$, which are journaled in a yoke $h$. This yoke is provided with clamping rings $i$ which are screw threaded to receive the screw bushings $j$ which have right and left handed threads respectively, to be screwed into the clamping rings $i$, the clamping rings being held in any adjustable position by tightening the clamping screws. These bushings are preferably made of hardened steel with cone bearings adapted to fit the cone journals of the crank shaft and each bushing has preferably a part of its screw threads cut away to form an annular oil duct $k$ which communicates with suitable radial oil ducts in the clamping rings and bushings to permit of introducing a lubricant from the outside into the bearings.

The yoke is provided with grooves $l$ adapted to fit the parallel ways $c$ upon which the yoke is secured by a clamping bolt $m$ or in any other suitable manner, to permit its being adjusted longitudinally, for the purpose of taking up any slack in the drive chain. To make this adjustment more accurately for the purpose of regulating the tension of the drive chain, I provide an adjusting screw $n$ which is held by an eye lug $o$ on the frame and tapped into the yoke, all so arranged that by turning the head of the adjusting screw the chain may be tightened to any desired degree, the yoke after its adjustment being then firmly clamped to the ways. I preferably place a spring $p$ upon the regulating screw $n$ between the eye lug $o$ and the yoke for the purpose of preventing any lost motion in the adjusting means.

A valuable feature of my construction is the provision I make for permitting the yoke to be attached either to the top or bottom of the ways, with the same facilities of adjustment in either position. To this end I provide a grooved clamping plate $q$ through which the clamping bolt $m$ passes, and which is adjustable upon the ways. This plate I provide with a screw threaded lug $r$ which is adapted to receive the end of the adjusting screw $n$ when the parts are reversed as shown in Fig. 6. It is obvious, however, that by providing another eye lug $o'$ on the under side of the frame corresponding to the eye-lug $o$, as shown in dotted lines in Fig. 6, the adjusting screw may be transferred to the under side, when the yoke is reversed.

The cone seat bushings not only permit of taking up the wear in the bearings, but they also permit of adjusting the crank shaft laterally, whereby the sprocket wheel on the crank shaft can be brought into alignment with the sprocket wheel on the drive shaft. To this end the bushings are provided with pin holes or other suitable holes for turning them to obtain the desired lateral adjustment of the crank shaft, after which the bushings are firmly clamped to prevent their being displaced by the clamping bolts which pass through the slotted ends of the clamping rings of the yoke.

The bushing on the short end of the crank shaft, being the most accessible, I provide with a projecting head preferably a milled head, whereby it can be conveniently adjusted by hand, or with a suitable tool for the purpose of taking up any wear without dismounting the crank shaft. As the other bushing after being once properly adjusted requires new adjustment very rarely, I make it flush or nearly so with the end of the yoke, and thus the sprocket wheel may be set close to the bearing, which is an obvious advantage.

D, D', are two collars secured upon the front upright and provided with rearwardly extending lugs $D^2$, $D^3$, which form the steering head to which the front spine is pivotally connected. The lower collar, D', forms a reinforcement for the front upright, at its connection with the neck of the fork, and the lug $D^3$ is provided with a knuckle $D^4$, to which the arm F', of the brake-shoe E, is pivotally secured and with the nosing $D^5$, to which the upper end of the front wheel mud-guard is secured. The arm F' is formed in one piece with the brake shoe E, it is pivotally secured to the knuckle $D^4$, and extends forwardly on top of the wheel.

What I claim as my invention is—

1. The combination with the drive wheel and the sprocket-wheel revolving therewith, of the crank shaft provided with a sprocket wheel, and adjustable laterally, whereby the said sprocket wheel can be brought into alignment, substantially as described.

2. The combination with the drive-wheel and the frame, of the crank shaft adjustable laterally to align the sprocket wheels, and also adjustable to and from the axis of the drive-wheel to regulate the tension on the drive-chain, substantially as described.

3. The combination with the bicycle frame having a slot, the ways formed on the frame adjacent to the slot, the yoke provided with grooves to fit the ways, the clamping bolt passing through said slot and the adjusting bolt of the yoke passing through an eye lug on the frame, substantially as described.

4. The combination with the bicycle frame having a slot of the ways formed on top and bottom of the frame adjacent to the slot, the yoke provided with grooves to fit said ways, the clamping bolt of the yoke passing through the slot and the clamping plate interposed between the ways and the head of the clamping bolt, and having grooves to fit the ways, substantially as described.

5. The combination with the bicycle frame having a slot of the ways formed on the top and bottom of the frame, adjacent to the slot, the yoke provided with grooves to fit said ways, the clamping bolt of the yoke passing through the slot, the clamping plate interposed between the head of the bolt and the frame, and having grooves to fit the ways, the adjusting bolt of the yoke engaging into an eye-lug on the frame, and the spring interposed between said eye lug and the yoke, substantially as described.

6. The combination with the yoke, of the bicycle frame, consisting of a tubular front portion curved over the front wheel and extending rearwardly in horizontal line with the drive axle and a slotted rear portion united at one end to the tubular front portions and at the other end to the drive wheel fork and provided with the parallel ways $b$ upon which the yoke is adjustably secured, substantially as described.

7. The combination with the crank axle and its yoke of the bicycle frame, consisting of a tubular front portion curved over the front wheel and extending rearwardly in horizontal line with the drive axle, and a slotted portion having the parallel ways $b$ formed adjacent to the slot and upon which the yoke is adjustably secured, the socket $d$ into which the seat tube is secured, the neck $a$ secured into the tubular front portion, and the thimble $e$ into which the neck of the drive wheel fork is secured, substantially as described.

8. In a bicycle the combination with a front fork and upright of collars forming bearings for the steering head, a knuckle on the under side of the lower collar, a brake shoe secured to the knuckle and a nosing extending rearwardly therefrom and integral therewith, for attaching the mud guard, substantially as described.

9. In a bicycle, the combination of a frame, having a tubular front portion bent over the front wheel and extending rearwardly in horizontal line with the drive axle, and a slotted rear portion united thereto and formed with the parallel ways $b$, at top and bottom of each side of the slot, the yoke $h$ provided with parallel grooves fitting said ways, the clamping rings formed at each end of the yoke and provided with bushings $j$, in which the crank axle is journaled, the clamping bolt $m$ and grooved clamping plate $q$, and the adjusting screw $n$, all arranged substantially as described.

In testimony whereof I affix my signature, in presence of two witnesses, this 19th day of February, 1890.

GEORGE HARRIOTT.

Witnesses:
 STEPHEN BROPHY,
 ADOLPH BARTHEL.